A. O. HIGINBOTHAM.
STEERING GEAR FOR VEHICLES.
APPLICATION FILED AUG. 6, 1914.
1,222,290.
Patented Apr. 10, 1917
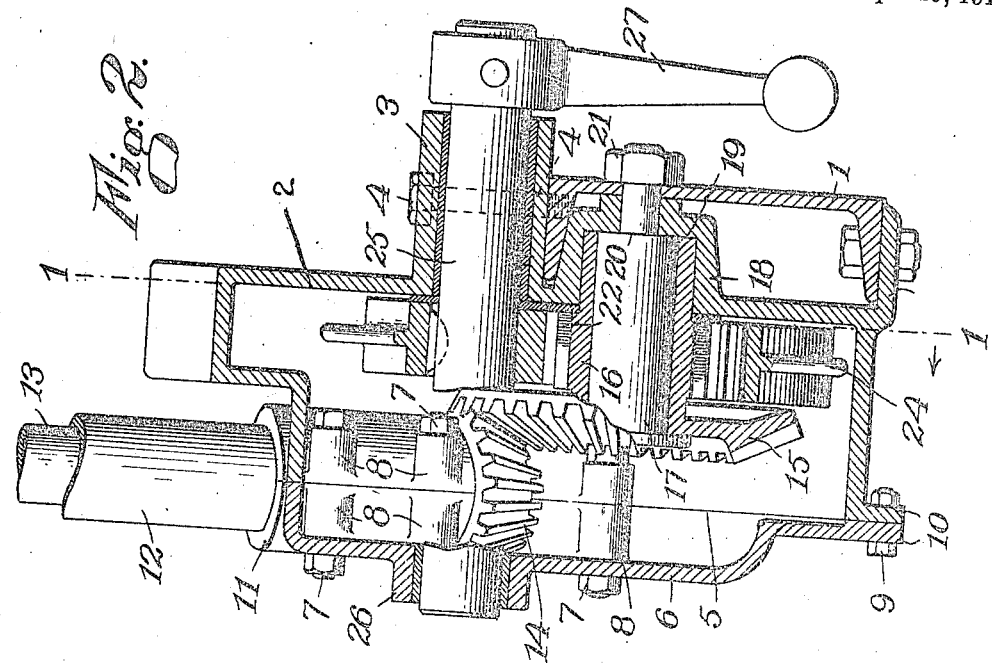
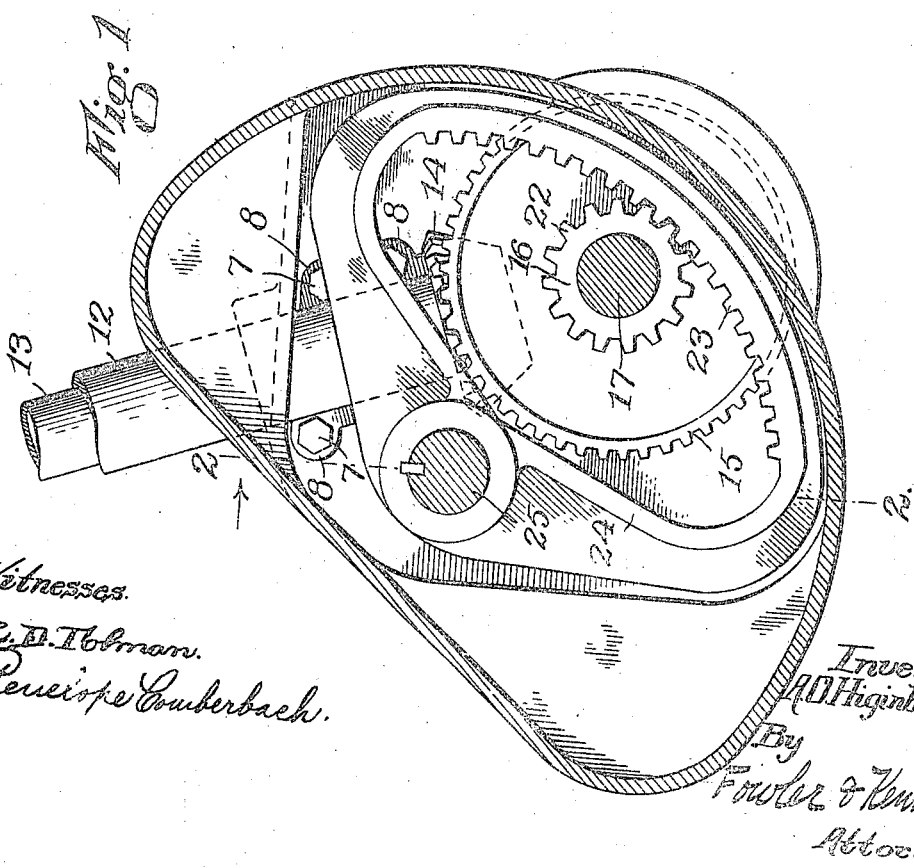
Witnesses.
R. D. Holman.
Penelope Cowberbach.
Inventor
A. O. Higinbotham
By
Fowler & Kennedy
Attorneys

UNITED STATES PATENT OFFICE.

ARTHUR O. HIGINBOTHAM, OF WORCESTER, MASSACHUSETTS, ASSIGNOR TO CHARLES B. FOSTER AND COMPANY, OF WORCESTER, MASSACHUSETTS, A COPARTNERSHIP CONSISTING OF CHARLES B. FOSTER, ARTHUR O. HIGINBOTHAM, AND JEROME R. GEORGE.

STEERING-GEAR FOR VEHICLES.

1,222,290.  Specification of Letters Patent.  Patented Apr. 10, 1917.

Application filed August 6, 1914. Serial No. 855,522.

*To all whom it may concern:*

Be it known that I, ARTHUR O. HIGINBOTHAM, a citizen of the United States, residing at Worcester, in the county of Worcester and Commonwealth of Massachusetts, have invented a new and useful Improvement in Steering-Gear for Vehicles, of which the following, taken in connection with the accompanying drawings, is a specification.

The present invention relates to a steering gear for motor vehicles, the object of the invention being to provide a strong, simple, and easily operated mechanism by means of which the steering wheels may be readily turned to different angles with relation to the body of the vehicle.

My invention is primarily designed for use in connection with the front wheel and steering knuckle assemblage set forth and described in my copending application, Serial Number 854,630, filed Aug. 3, 1914, for a motor vehicle. The invention set forth and described in said co-pending application is characterized by the absence of the usual tendency of the front wheels to be deflected out of their course by surface obstructions in the road, making it possible to eliminate the employment therewith of the usual "irreversible" type worm and sector or worm and nut steering gear, which possesses the ability to resist such deflecting tendency.

The present invention, which is applicable to any front wheel and steering knuckle assemblage possessing the above characteristics, takes the form of a rack and pinion arrangement, and the construction of the same is fully set forth in the following description and pointed out in the claims annexed thereto, reference being had to the accompanying drawings, in which Figure 1 is a sectional view on the line 1—1, Fig. 2, illustrating my invention.

Fig. 2 is a transverse section on the line 2—2, Fig. 1.

Like parts are indicated by like reference characters in the different figures.

In the drawings, the numeral 1 denotes one of the longitudinal side members of the vehicle frame or chassis, on the inner side of which is disposed the casing or housing 2 of my improved steering gear. The side of said housing is formed with a lateral hollow boss 3, having ears or lugs through which bolts 4 are passed to secure said housing to the upper flange of the channel member 1. Said housing 2 is a two-part structure, being divided on the line 5, and the cover member 6 is secured to the main portion by bolts 7, 7, extending through internal lugs or ears 8, 8, formed in corresponding parts of said cover member and main portion, and by bolts 9 uniting the flanges 10 formed on the edges of said cover member and main portion.

Each section of the housing coöperates at the line of division 5, in forming an inclined hollow boss 11 for the reception of the lower end of the steering column 12, which contains a steering rod 13 having on its upper end a steering wheel, not shown, of the ordinary type. The lower end of said rod 13 has rigidly secured thereto a bevel pinion 14, which meshes with a bevel gear 15. The hub 16 of the latter is journaled on a stub shaft or pin 17, and the outer end of said hub is received within an enlargement 18 of the housing which projects within the channel member 1, and bears against the inner face of the vertical wall thereof. The enlargement 18 is shouldered as at 19, to form an abutment for the outer end of hub 16 and for a shoulder 20 formed by a reduction in the diameter of pin 17, the reduced portion of said pin passing through the enlargement and through the member 1, and receiving on its outer end a nut 21, by means of which the parts may be drawn into and held in the position shown in Fig. 2.

A spur pinion 22 integral with the hub 16 meshes with the teeth of a curved rack 23 formed on a segmental member 24 secured to a rock shaft 25. The segmental member 24 is skeleton in form, the material at the central portion thereof being removed to provide ample space for the pinion 22. The rock shaft 25 extending parallel to the pin 17, is journaled at one end in a bushing carried by the hollow boss 3, and at the other end in a bushing carried by a hollow boss 26 on the cover member 6. The outer end of said rock shaft has rigidly secured thereto an arm 27 which is adapted to be connected by a link, not shown, to the steering knuckle of the vehicle, in the usual and well known manner.

Rotation of the steering column effects, through the intermeshing gearing above described, the rocking of member 24 in one direction or the other and the movement thereof, through the rock shaft 25 and arm 27 is communicated to the steering knuckle of the vehicle.

The construction above described possesses advantages over the ordinary worm type of steering gear, not only with respect to the ease of manufacture and assemblage of parts, but also the ability of said parts to stand constant usage without appreciable wear. The lost motion which soon appears in steering gears of the "worm" type, necessitating frequent adjustment of the same to compensate therefor, is practically absent in the steering gear of my invention, since the excessive friction always attendant upon the use of a worm gear is eliminated, and the parts of my steering gear can be made massive enough to practically nullify the effect of any slight wear which may take place.

I claim,

1. In a steering gear, a steering rod, a rotatable pinion having a fixed axis of rotation, means operatively connecting said rod and pinion, and a rocking member carrying an internal gear in mesh with said pinion.

2. In a steering gear, a steering rod, a rotatable pinion having a fixed axis of rotation, means operatively connecting said rod and pinion, and a pivotally supported member having teeth in mesh with the teeth of said pinion.

3. In a steering gear, a steering rod, a rotatable pinion having a fixed axis of rotation, means operatively connecting said rod and pinion, and a pivoted member having a segmental internal gear meshing with the teeth of said pinion.

4. In a steering gear, a steering rod, a rotatable pinion having a fixed axis of rotation, bevel gearing operatively connecting said rod and said pinion, and a member pivoted on one side of the axis of said pinion, and having teeth in engagement with said pinion on the opposite side of the axis of said pinion.

5. In a steering gear, a steering rod, a gear carried thereby, a second gear in mesh with said first gear, a pinion carried by the hub and said second gear, said pinion having a fixed axis of rotation, and a rocking member disposed in surrounding relation to said pinion and having an internal gear meshing with said pinion.

Dated this thirtieth day of July, 1914.

ARTHUR O. HIGINBOTHAM

Witnesses:
PENELOPE COMBERBACH,
NELLIE WHALEN.